United States Patent [19]
Ballocci et al.

[11] 3,949,858
[45] Apr. 13, 1976

[54] HANDRAIL FOR PASSENGER CONVEYORS AND THE LIKE

[75] Inventors: Giovanni Ballocci, Monza; Aurelio Brollo, Milan, both of Italy

[73] Assignee: Industrie Pirelli S.p.A., Milan, Italy

[22] Filed: May 2, 1974

[21] Appl. No.: 466,463

[30] Foreign Application Priority Data
May 4, 1973 Italy .................................. 23718/73

[52] U.S. Cl. ............................. 198/16 R; 198/193
[51] Int. Cl.² ......................................... B66B 9/14
[58] Field of Search ............. 198/16 R, 16 MS, 193; 57/140 G

[56] References Cited
UNITED STATES PATENTS

| | | | |
|---|---|---|---|
| 1,101,209 | 6/1914 | Pitt | 198/16 R |
| 2,140,034 | 12/1938 | Shonnard | 198/16 R |
| 2,669,339 | 2/1954 | Hausen | 198/16 R |
| 3,029,589 | 4/1962 | Caroselli et al. | 57/140 G |
| 3,048,256 | 8/1962 | Skinner | 198/16 R |
| 3,049,213 | 8/1962 | Fabula | 198/16 R |
| 3,321,060 | 5/1967 | Mullis et al. | 198/16 R |
| 3,463,290 | 8/1969 | Tajima | 198/16 R |
| 3,623,590 | 11/1971 | Johnson | 198/16 R |
| 3,633,725 | 1/1972 | Smith | 198/16 R |
| 3,776,293 | 12/1973 | Marzocchi | 57/140 G |

*Primary Examiner*—Evon C. Blunk
*Assistant Examiner*—Richard K. Thomson
*Attorney, Agent, or Firm*—Stevens, Davis, Miller & Mosher

[57] ABSTRACT

A handrail constituted by a structural shape, C-shaped in cross section, made of elastomeric material and embedding a tension-resistant structure formed by an inextensible cord, which confers inextensibility to the handrail only at the line defined by the intersection between the neutral plane and the plane of symmetry of the handrail.

3 Claims, 3 Drawing Figures

HANDRAIL FOR PASSENGER CONVEYORS AND THE LIKE

The present invention concerns a handrail for passenger transport systems, as escalators, passenger conveyors and the like.

More particularly, the present invention relates to handrails constituted by a structural shape, which is movable at the same speed as the passengers' supporting surface of said escalators, passenger conveyors and the like and is guided on a rail carried by a fixed frame arranged at the side of said supporting surface.

An already known handrail is constituted by a structural shape, C-shaped in section, formed by a plurality of bands of fabrics doubled together and embedded in elastomeric material. Another conventional handrail is also constituted by a structural shape, C-shaped in section, which, besides the assembly formed by the bands of fabric embedded in elastomeric material, comprises a layer of inextensible cords, parallel and coplanar to one another, situated between two layers of fabric.

Said known handrails are very stiff and are unsuitable to be used in passenger transport systems whose travel comprises curved portions. In fact, the already known handrails do not practically possess a transversal flexibility.

Another disadvantage of conventional handrails is their high cost, which derives substantially from their complicate structure.

The present invention aims at providing a handrail for passenger transport systems as escalators, passenger conveyors and the like, which is able to travel along curves.

A further aim of the present invention is the provision of a handrail having a considerably reduced cost with respect to the cost of conventional handrails.

The object of the present invention is accordingly a handrail comprising a structural shape of elastomeric or plastic material, C-shaped in section, and means embedded in the elastomeric or plastic material which confer substantial inextensibility to the structural shape only at the line defined by the intersection between the neutral plane and the symmetry plane of the handrail, whereby the handrail is inextensible under tension and is able to follow travels comprising curved portions.

The present invention will be better understood from the following detailed description, given only by way of non-limiting example and made with reference to the attached sheet of drawing, in which.

Figure 1:
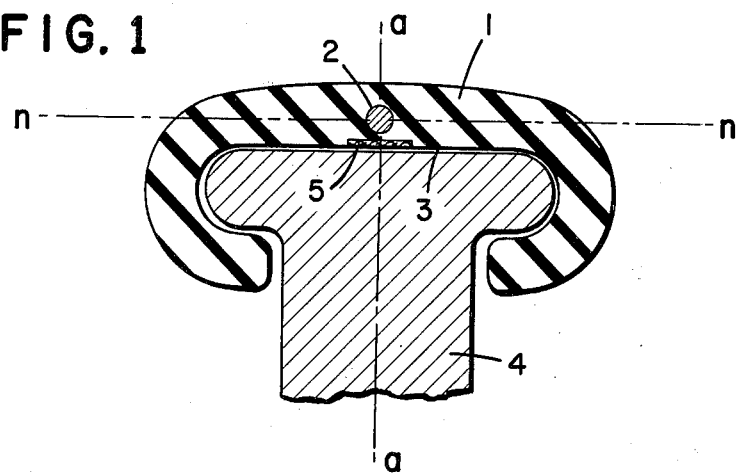
FIG. 1 is the cross section of a handrail according to one embodiment of the present invention.

As it can be seen in FIG. 1, the handrail is constituted by a structural shape 1, C-shaped in section, completely made of elastomeric or plastic material.

The structural shape 1 contains, embedded into it, an inextensible cord 2. The cord 2 is arranged in the structural shape in such a way that its axis lies on the straight line originated as intersection between the symmetry plane of the structural shape, whose trace on the plane of the figure is represented by the segment $a\ a$ of straight line, and the neutral plane, whose trace on the plane of the figure is represented by the segment $b\ b$ of straight line.

A band of fabric 5 is embedded in the face 3 of the structural shape 1, namely on the inner face of the latter intended to slide on a guiding rail 4, in such a way as to be at the same level of said face.

The band of fabric 5 is positioned in the face 3 in such a way as to be symmetrical with respect to the plane of symmetry of the structural shape, whose trace on the plane of the figure — as already said — is represented by the segment $a\ a$ of straight line.

The width of said band of fabric 5 is at the minimum equal to 2.4 times the diameter of the cord 2 to prevent said cord from outcoming from the body of elastomeric material forming the handrail, thus cutting the latter.

Moreover, said band of fabric 5 has the task of reducing the sliding friction between the handrail and the rail 4.

Figure 2:
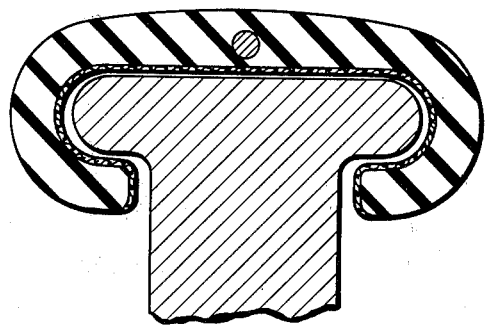
FIG. 2 is a cross section of a handrail according to an alternative embodiment of the invention.

In FIG. 2, the illustrated alternative embodiment differs from the embodiment of FIG. 1 only for the fact that the band of fabric 5 covers completely the face 3 of the structural shape, and this in order to further reduce the sliding friction between the handrail and the rail 4.

Figure 3:
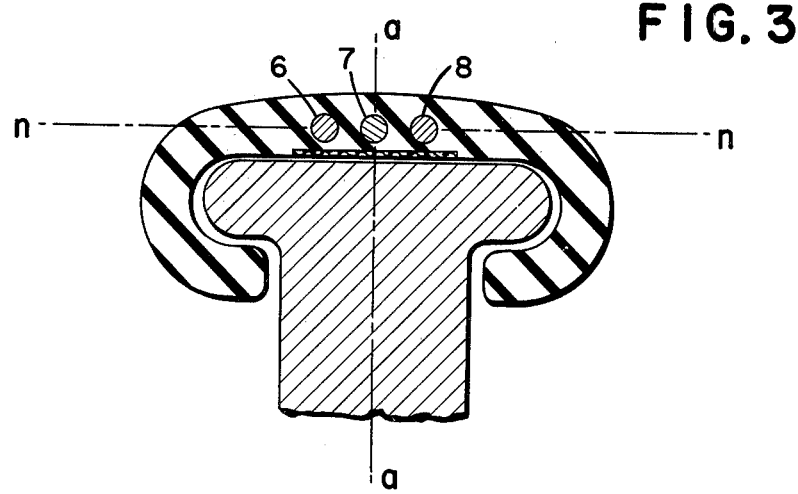
FIG. 3 is a cross section of a handrail according to a further alternative embodiment of the invention.

In FIG. 3, the illustrated alternative embodiment differs from the embodiment of FIG. 1 for the resistant insertion.

In FIG. 3, the resistant insertion is in fact constituted by three cords 6, 7 and 8.

The cords 6, 7 and 8 are coplanar and parallel and their axes lie on the neutral plane of the structural shape, whose trace on the plane of the figure is represented by the segment $n\ n$ of straight line. In particular, cord 7 has its own axis lying on the straight line originated by the intersection between the plane of symmetry of the structural shape, whose trace in FIG. 3 is represented by the segment $a\ a$ of straight line, and the neutral plane, whose trace in FIG. 3 is represented by the segment $n\ n$ of straight line. The cords 6 and 8 are situated at opposite sides with respect to the cord 7 and at an equal distance therefrom.

The cord 7 is practically inextensible, whilst the cords 6 and 8 are relatively extensible. The entity of the extensibility of cords 6 and 8 is a function of their distance from cord 7 and of the bending radius of the curve to be followed by the handrail.

The extensibility of cords 6 and 8 as a function of their distance from cord 7 and of the bending radius to which the handrail is subjected in the curve it has to follow must be such that the smaller the bending radius and the greater the distance from cord 7 the greater the extensibility of cords 6 and 8.

Moreover, the cords 6 and 8 must have an extensibility not due to the nature of the material, but to the geometrical configuration of the elements constituting them, so that, once the cords have suffered the elongation due to the geometry of their configuration, they are practically inextensible. In other words, a cord 6 or 8 can for instance be made by practically inextensible elements (for instance metal wires) stranded together in a loose way.

In this way, when a cord of this type is subjected to tension, the metal wires forming it approach mutually, originating the elongation of the cord by variation of the geometrical configuration of the wires. However, once the wires forming the cord, owing to the tension action, are no longer stranded in a loose way, the cord becomes practically inextensible, since its elongation corresponds to the elongation of the wires constituting it, which, as said above, are inextensible.

That the handrail according to the present invention permits to obtain the desired advantages is easily comprehensible and is explained by the following considerations.

The presence of only one cord positioned with its own axis at the straight line defined by the intersection between the neutral plane and the plane of symmetry of the body of the handrail has as a consequence that the latter, being nearly completely made of elastomeric or plastic material, can be curved in any direction without substantially causing distortions or deformations of the cross section of the handrail.

Moreover, in the event that more than one cord is used — for instance three as in the particular embodiment described — the elongation of the cords not having their own axis lying on the straight line originated by the intersection between the neutral plane and the plane of symmetry of the handrail allows equally well the latter to follow travels comprising curved portions. In fact, the elongation of the cords permit to balance the differences in the development of the handrail caused by the presence of curved portions in its course.

Although some embodiments of the present invention have been illustrated and described, it is understood that it includes in its scope any other possible variation accessible to a technician of this field.

What is claimed is:

1. An elastomeric handrail for a passenger conveyor, C-shaped in cross-section, comprising a substantially inextensible cord embedded therein and extending longitudinally through the handrail along the point of intersection of the neutral plane and plane of symmetry thereof and at least one cord substantially parallel to the inextensible cord disposed on each side thereof, the said cords on each side of the inextensible cord being relatively extensible, and a fabric embedded in the inner surface of the handrail at a level where its outer surface is on substantially the same level as said surface, said fabric being opposite the cords and extending at least just beyond the said relatively extensible cords which are farthest removed on each side from the said extensible cords.

2. The handrail of claim 1 wherein the fabric covers the entire inner surface of the handrail.

3. The handrail of claim 1 wherein the width of the band of fabric is at least 2.4 times the diameter of the inextensible cord.

* * * * *

UNITED STATES PATENT AND TRADEMARK OFFICE
CERTIFICATE OF CORRECTION

PATENT NO. : 3,949,858
DATED : April 13, 1976
INVENTOR(S) : Giovanni Ballocci et al It is certified that error appears in the above-identified patent and that said Letters Patent are hereby corrected as shown below:

Column 1, line 32, change "complicate" to ---complicated---.

Column 2, line 1, change "b b" to ---n n---; line 14, delete "outcoming from" and insert ---coming out of---.

Signed and Sealed this

Twenty-seventh Day of July 1976

[SEAL]

Attest:

RUTH C. MASON
*Attesting Officer*

C. MARSHALL DANN
*Commissioner of Patents and Trademarks*